United States Patent Office 3,198,771
Patented Aug. 3, 1965

3,198,771
AMORPHOUS POLYAMIDES FROM AROMATIC DICARBOXYLIC ACIDS AND AN ETHYL SUBSTITUTED ALKYLENE DIAMINE
Rudolf Gabler, Zollikerberg, Zurich, Switzerland, assignor to W. R. Grace & Co., Cambridge, Mass., a corporation of Connecticut
No Drawing. Filed June 30, 1961, Ser. No. 120,942
The portion of the term of the patent subsequent to Sept. 22, 1981, has been disclaimed
11 Claims. (Cl. 260—78)

This invention relates to synthetic linear polyamides and particularly to terephthalamide and isophthalamide polymers which are transparent, thermoplastic and characterized by a high degree of swelling in certain organic liquids. The new polyamides of my invention cannot be drawn to form useful textile fibers but are easily moldable by injection or vacuum molding techniques or by extrusion, to form a large variety of useful shaped articles. In addition, because of their ability to swell and become liquefied in polar organic solvents, the new polyamides of my invention may be used in coatings or adhesives, or may be cast into clear, tough, transparent films.

Linear fiber-forming polyamides suitable for use in the manufacture of tire cords have been made by condensing terephthalic acid with polymethylene diamines having from six to eight carbon atoms in the hydrocarbon chain and substituted by one, or at the most two, methyl groups. These polyamides, which are described in United States Patent No. 2,752,328, are typical nylon polymers, being opaque, highly crystalline, easily drawn to form useful textile fibers, and melting over a narrow temperature range.

I have discovered that polyamides of radically different properties from the fiber-forming nylons described above may be made by condensing substantially equimolar proportions of terephthalic acid, isophthalic acid or mixtures thereof with a polymethylene diamine containing at least six methylene groups, one of which is substituted by an ethyl group. The amino groups of the diamine must be separated by a straight chain of at least 6 carbon atoms in order to prevent side reactions due to ring closures of a part of the diamine which would result in the formation of relatively short-chained polyamides. Diamines suitable for the polycondensation reaction generally possess from six to ten carbon atoms in the main chain.

The new polyamides of my invention contain recurring units having the following structure:

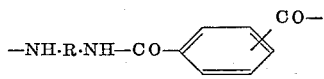

where R is a straight chain of at least 6 methylene groups, one of said methylene groups being substituted by an ethyl group.

Although the polyamides of my invention are closely similar in chemical structure to those of the prior art, they nevertheless possess a number of strikingly different characteristics which set them apart from the prior art polymers. The most striking property of the new polyamides of my invention is their transparent, glass clear appearance, which persists even after prolonged periods of heating and slow cooling. It is evident that these new polymers are completely amorphous, and that their amorphous state is thermodynamically stable. The new polymers, furthermore, soften gradually over a wide temperature range, usually about 20 to 40 degrees centigrade, and for this reason are particularly well suited to molding and other shaping procedures. They are not only soluble in typical polyamide solvents such as sulfuric acid, formic acid, phenol and cresol, but also swell extensively in the lower alcohols, for example, methanol, ethanol and isopropanol, to give honey-like pourable masses suitable for coating and adhesive applications. The polyamides of my invention have excellent tensile strength, impact resistance, and flexibility. Unlike conventional polyamides, however, they have a very low capacity for elongation. This property, together with their completely amorphous nature, makes the polyamides of my invention unsuitable for the production of artificial textile fibers.

Terephthalic acid, isophthalic acid or mixtures of the two acids may be used to produce the polyamides of my invention. The discovery that mixtures of these acids may be employed to produce useful polyamides is most unexpected, since ordinarily the use of mixtures of acids in the preparation of superpolyamides results in products which have much lower melting points and generally less desirable properties than the corresponding polyamides made from either acid alone.

The polyamides of my invention are clear and transparent and have generally similar properties whether they are made with terephthalic acid, isophthalic acid or with mixtures of the two. The terephthalamides are generally preferred for most purposes, however, since their melting points are from 50 to 100° C. higher than and their mechanical properties somewhat superior to those of the corresponding isophthalamides. The melting points and mechanical properties of the mixed polymers are intermediate between those of the two types of homopolymers.

Of particular interest are the polyamides of acid mixtures containing only small amounts of isophthalic acid, preferably not more than about 5 or at the most 10 percent. These mixed polyamides melt at temperatures only slightly lower than do the corresponding terephthalamide polymers, and are indistinguishable from the pure terephthalamides with respect to their mechanical properties. For this reason, the polyamides made from low isophthalic acid content mixtures constitute a preferred form of my invention. It is particularly important from an economic point of view that this preferred group of mixed polymers may be made from the less purified and therefore less expensive grades of terephthalic acid in which a small proportion of isophthalic acid is present as an impurity. Terephthalic acid is often produced from p-xylene, or alternatively it may be made by the isomerization of o-phthalic acid. In both these processes, it is difficult to avoid the presence of a small amount of isophthalic acid. Since a considerable portion of the cost of high purity terephthalic acid is due to the tedious and costly procedures which are necessary in order to remove the m-isomers either from the raw material or from the final product, a terephthalic acid which contains a few percent of isophthalic acid will, of course, be much less expensive than the 100 percent p-isomer. The ability to use the less expensive grades of terephthalic acid in the manufacture of polyamides is an important aspect of my invention.

My invention will be more clearly understood by reference to the following examples in which all parts shown are by weight.

EXAMPLE I 2.03 g. of terephthaloyl chloride was dissolved in 100 ml. carbon tetrachloride and vigorously stirred in a mixer equipped with rotating blades. To this mixture, a solution of 1.5 g. of 3-ethylhexamethylenediamine and 1.3 g. potassium hydroxide in 200 ccm. water was added all at once. The polyamide formed immediately in practically quantitative yield as a white powder. It was stirred for a further 3 minutes, then sucked off, washed several times with methanol and water and dried. The resulting polyamide (2.5 g.) had a melting point of 180° C. and an intrinsic viscosity of 0.72. When melted and cast into rods, the polyamide of Example I was clear and transparent.

EXAMPLE II 16.6 parts of terephthalic acid were mixed with 30 ml. water and brought almost to boiling on a steam bath. By means of a dropper funnel, a solution of 15.5 parts of 2-ethylhexamethylenediamine in 50 ml. alcohol was slowly added dropwise; this finally resulted in the complete solution of the terephthalic acid. After cooling, the terephthalic acid salt of 2-ethylhexamethylenediamine precipitated out as colorless crystals.

A mixture of 300 g. of the above salt, 100 ml. water and 0.5 g. of glacial acetic acid was heated to 140° C. with constant agitation and exclusion of air in a 1 liter dissolving vessel of a stainless steel autoclave also having a capacity of 1 liter, resulting in the total solution of the salt. With the aid of pure nitrogen, the solution was passed through a filter into the autoclave which had been preheated to 250° C. This resulted in a drop in temperature within the autoclave to 160–180° C. When the heat was turned on, the pressure and temperature rose rapidly. Water vapor was released by opening the valve in the cover so that pressure equalization with atmospheric pressure was obtained at approximately the same time that an inside temperature of 250° C. was reached.

The melt was now heated without pressure to a temperature of 280° C. over a period of 3½ hours. The temperature was held at this point for 2 hours more and then the melt was extruded into cold water by means of nitrogen pressure, so as to form cylindrical rods. The polymer was transparent, melted over the range of 180–200° C. and had an intrinsic viscosity of 1.2. The rods were found to have good physical and mechanical properties. They could be cut with a knife without crumbling, were tough and strong, and had a high impact resistance. The polymer could be melted and extruded or injection molded to give useful articles of a variety of shapes. It could be cast or otherwise formed into a tough, transparent film suitable for packaging purposes.

EXAMPLE III

The salt of isophthalic acid and 3-ethylhexamethylenediamine was prepared according to the method of Example II.

30 g. of this salt was melted in a thick-walled glass tube under nitrogen and heated to 280° C. for 5 hours. After cooling the tube was opened, some of the condensation water was poured off, and the tube heated to 250–280° C. under a stream of nitrogen for a further period of 3½ hours. Finally, the tube was held at the same temperature for 1 hour at a pressure of 8.1 mm. Hg and then cooled.

The resulting, light-colored, transparent polyamide, melting at 130–150° C., had an intrinsic viscosity of 0.8. Except for its lower melting point and somewhat lower strength the polyamide of this example was quite similar to that of Example II. It was particularly useful for the preparation of liquid coating and adhesive compositions.

EXAMPLE IV

The method of Example II was followed, using 16.6 parts of a mixed acid containing 90 percent of terephthalic acid and 10 percent of isophthalic acid together with 15.5 parts of 2-ethylhexamethylenediamine in the preparation of the salt. The polyamide produced by the polycondensation step was transparent, glass clear, melted over a range of 160–180° C. and had an intrinsic viscosity of 1.0.

The polyamide of this example was indistinguishable in its mechanical properties from that of Example II and was suitable for the same uses.

EXAMPLE V

The method of Example II was followed, using 16.6 parts of a mixed acid containing 40 percent terephthalic acid and 60 percent isophthalic acid, together with 15.5 parts of 2-ethylhexamethylenediamine in the preparation of the salt. The polyamide produced by the polycondensation step was transparent, glass clear, melted over a range of 130–150° C. and had an intrinsic viscosity of 0.8. It was very similar in properties to the polyamide of Example III and, like that polymer, was particularly suitable for the production of liquid coating and adhesive compositions.

EXAMPLE VI

The process of Example II was followed, using 16.6 parts of terephthalic acid and 16.5 parts of 3-ethylheptamethylenediamine in preparation of the salt.

The polyamide which was produced by the polycondensation reaction was transparent and glass clear, melted over the range of 165 to 185° C. and had an intrinsic viscosity of 0.95. Its properties were similar to those of the polyamide of Example II and it was suitable for the same uses.

EXAMPLE VII

The process of Example II was followed using 16.6 parts of terephthalic acid and 17.5 parts of 4-ethyl-octamethylenediamine in the preparation of the salt.

The polyamide which was produced by the polycondensation reaction was transparent and glass clear, melted over the range of 120 to 140° C. and had an intrinsic viscosity of 1.0. It was particularly suitable for the production of flexible packaging films.

EXAMPLE VIII

A polyamide was made by the process of Example II, using 16.6 parts by weight of isophthalic acid and 16.5 parts of 3-ethylheptamethylenediamine in the preparation of the salt. The polyamide which was formed by polycondensation of the salt was transparent, glass clear, melted over a range of 110 to 130° C. and had an intrinsic viscosity in one percent sulfuric acid of 2.2. The polymer was very similar in mechanical properties to that of Example III and was suitable for the same applications.

EXAMPLE IX

Polyamides were made according to the process of Example II using terephthalic acid and the following substituted polymethylenediamines: 3-methylhexamethylenediamine; 3-methylheptamethylenediamine; 4-methyloctamethylenediamine; and 2,5-dimethylhexamethylenediamine. The resultant products were compared with several of the new terephthalamides made according to the preceding examples, the results of the comparison being shown in Table I.

*Table I*

| Ex. No. | Diamine Used | Melting Point, °C. | Optical Properties | Crystallinity | Useful Textile Fibers |
|---|---|---|---|---|---|
| I | 3-ethylhexamethylene. | 180 | Transparent | Amorphous | No. |
| II | 2-ethylhexamethylene. | 180–200 | do | do | No. |
| VI | 3-ethylheptamethylene. | 165–185 | do | do | No. |
| VII | 4-ethyloctamethylene. | 120–140 | do | do | No. |
| IX | 3-methylhexamethylene. | 270–280 | Opaque | Crystalline | Yes. |
| IX | 3-methylheptamethylene. | 220 | do | do | Yes. |
| IX | 4-methyloctamethylene. | 245 | do | do | Yes. |
| IX | 2,5-dimethylhexamethylene. | 285 | do | do | Yes. |

It will be seen by reference to Table I that the new polyamides of my invention possess properties which are strikingly and unexpectedly different from the very closely related polymers made according to Example IX. The sudden change from opaque, crystalline, textile fiber-forming polymers to glass clear, completely amorphous resins which do not form useful textile fibers with such a seemingly minor change in structure could not have been predicted.

The new polyamides made according to the above examples were characterized by their glass clear, transparent appearance, by softening gradually over a wide temperature range, by high tensile strength, impact resistance and flexibility, and by a room temperature elongation at break of less than 10 percent. They exhibited a high degree of swelling in the lower alcohols and were soluble in solvent mixtures containing 80 percent by volume of chloroform and 20 percent by volume of methanol. They have been found to be highly useful in the production of shaped articles including molded goods of all kinds, sheets and films, as well as for coating and adhesive applications.

This application is a continuation-in-part of my copending application Serial No. 64,713, filed October 25, 1960, now abandoned.

I claim:

1. A linear amorphous film-forming polyamide of an aromatic dicarboxylic acid selected from the group consisting of terephthalic acid, isophthalic acid and an acid mixture of 90 to 95 percent terephthalic acid and 5 to 10 percent isophthalic acid consisting of recurring structural units of the formula

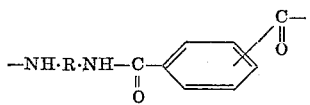

wherein R is an alkyl-substituted saturated hydrocarbon chain 6 to 10 carbon atoms in length in which the alkyl substitution consists of one ethyl group.

2. The polymer of claim 1 wherein the acid is terephthalic acid.
3. The polymer of claim 1 wherein the acid is isophthalic acid.
4. The polymer of claim 1 wherein the acid is a mixture of 90 to 95 percent terephthalic acid and 5 to 10 percent isophthalic acid.
5. The polymer of claim 1 wherein the acid is terephthalic acid and R is the alkyl-substituted hydrocarbon chain of 3-ethylhexamethylenediamine.
6. The polymer of claim 1 wherein the acid is terephthalic acid and R is the alkyl-substituted hydrocarbon chain of 2-ethylhexamethylenediamine.
7. The polymer of claim 1 wherein the acid is isophthalic acid and R is the alkyl-substituted hydrocarbon chain of 3-ethylhexamethylenediamine.
8. The polymer of claim 1 wherein the acid is a mixture of 90 percent terephthalic acid and 10 percent isophthalic acid and R is the alkyl-substituted hydrocarbon chain of 2-ethyl hexamethylenediamine.
9. The polymer of claim 1 wherein the acid is terephthalic acid and R is the alkyl-substituted hydrocarbon chain of 3-ethylheptamethylenediamine.
10. The polymer of claim 1 wherein the acid is terephthalic acid and R is the alkyl-substituted hydrocarbon chain of 4-ethyloctamethylenediamine.
11. The polymer of claim 1 wherein the acid is isophthalic acid and R is the alkyl-substituted hydrocarbon chain of 3-ethylheptamethylenediamine.

References Cited by the Examiner

UNITED STATES PATENTS

| | | | |
|---|---|---|---|
| 2,742,496 | 4/56 | Lum et al. | 260—78 |
| 2,752,328 | 6/56 | Magat | 260—78 |
| 2,766,221 | 10/56 | Lum et al. | 260—78 |
| 2,864,807 | 12/58 | Nobis et al. | 260—78 |
| 2,902,475 | 9/59 | Burkhard | 260—78 |

WILLIAM H. SHORT, *Primary Examiner.*

HAROLD N. BURSTEIN, *Examiner.*